Patented Aug. 25, 1931

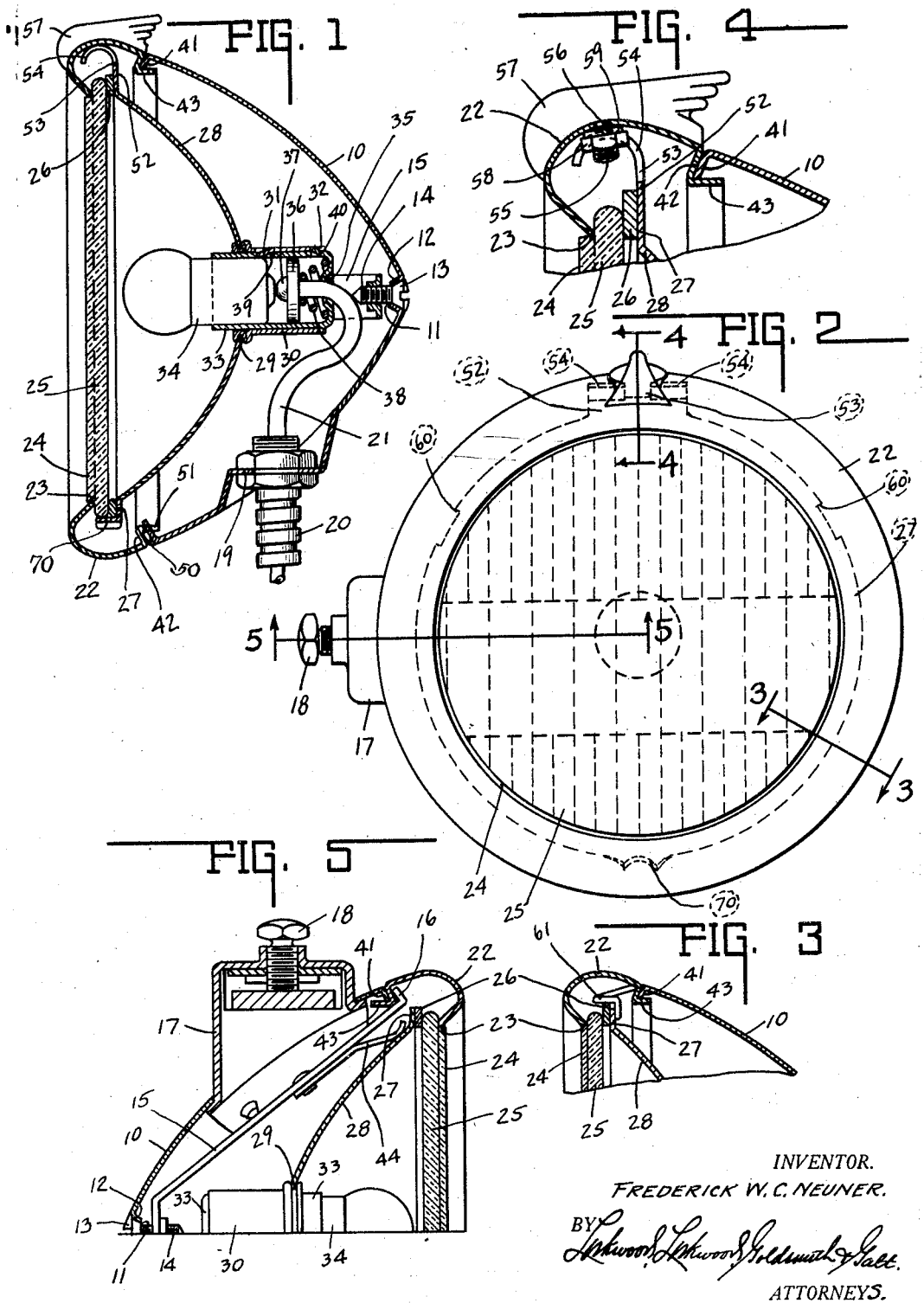

1,820,477

UNITED STATES PATENT OFFICE

FREDERICK W. C. NEUNER, OF CONNERSVILLE, INDIANA, ASSIGNOR TO INDIANA LAMP CORPORATION, OF CONNERSVILLE, INDIANA, A CORPORATION

VEHICLE LAMP

Application filed November 30, 1928. Serial No. 322,597.

This invention relates to a vehicle lamp suitable for side or cowl lamp mounting.

The chief object of this invention is to provide a simplified connection between the casing, reflector and door of such a lamp.

Another object of the invention is to provide the aforesaid lamp parts with locating portions whereby predetermined relative positioning of said parts is obtained.

The full nature of the invention will be understood from the accompanying drawings and the following description and claims:

In the drawings Fig. 1 is a vertical sectional view through a lamp including the invention. Fig. 2 is a front view thereof. Fig. 3 is a radial section taken on the plane 3—3 of Fig. 2. Fig. 4 is an enlarged section taken on line 4—4 of Fig. 2 and in the direction of the arrows. Fig. 5 is a quarter section taken on line 5—5 of Fig. 2 and in the direction of the arrows.

In the drawings 10 indicates a lamp casing having a central opening 11 defined by an inturned flange 12 forming a countersunk seat for the exposed head 13 of a screw bolt 14 which mounts a U-shaped door retainer 15 having angularly and outwardly directed free ends 16 for door rim engagement. Threading movement of the bolt causes the U-shaped clamp to move forwardly or rearwardly for door rim release or anchorage respectively.

The casing is provided with a lateral housing 17 supporting an anchoring member 18 whereby the lamp may be mounted upon a vehicle cowl through the lamp side. The casing is also formed with a horizontal ledge 19, the portion adjacent thereto being suitably formed so that the ledge merges with the casing contour. The ledge rigidly supports a protective or armored conduit 20, within which is mounted the insulated current conductor 21.

The door rim 22 has the annular opening 23 which receives the forward portion 24 of the lens or closure 25, the rim and closure forming the door. The closure bears upon the sealing strip or ring 26 which in turn bears against the peripheral and outwardly directed flange 27 at the forward edge of the reflector 28. A central aperture 29 therein mounts a metal sleeve 30. The sleeve has lateral enlargements upon opposite sides of the reflector aperture whereby said sleeve is rigidly supported by the reflector. The sleeve also has an inwardly directed tongue 31 and a slot or groove 32 in alignment therewith.

An insulation cup 33 has its open and forward end adapted to receive a light bulb 34 and detachably support the same. The opposite and substantially closed end of the cup has a central opening 35 through which the conductor 21 extends. Slidably mounted in said cup there is an insulation washer 36, through which said conductor also extends and terminates in the washer retaining enlargement 37 positioned for light bulb contact engagement. The coil spring 38 is concentrically mounted about the conductor and interposed between the washer 36 and the end of the cup. The cup has a slot 39 formed to receive the tongue 31 of sleeve 30, and projecting outwardly and forwardly from said cup there is a tongue 40 receivable by the slot 32 of said sleeve. The aforesaid multiple tongue and slot connections anchor the cup to the sleeve in socket formation.

The casing at its forward edge is provided with an inwardly directed peripheral flange 41 which is also forwardly directed. The door rim at its rearward edge is provided with a similarly directed peripheral flange 42, the two flanges being adapted to abut each other. The rim flange includes a rearward extension 43 which is telescopically received by the casing flange thereby providing a close fit. As shown clearly in Fig. 5 the outwardly directed end 16 of the clamp 15 is adapted to engage the flange 42 to hook and rigidly secure the door rim to the casing. Each arm of the U-shaped clamp supports a forwardly and inwardly directed spring 44 which bears upon the reflector 28 as shown in Fig. 5.

For locating purposes the bottom forward portion of the casing is provided with a rearwardly and inwardly as well as upwardly directed indentation, lug or tongue 50, and the door rim flange 43 is notched as at 51 to receive said tongue, 50. The door rim is thereby located relative to the casing.

The reflector flange 27 at its upper end includes an extension 52 radially slotted at 53 to form a pair of horns 54. A bolt 55 extends through the opening 56 at the top of the door rim and supports the ornament 57, the same being rigidly secured to said rim by the nut 58 and lock washer 59. The horns straddle this anchorage and the reflector is definitely located relative to the rim. Since the rim is definitely located relative to the casing, the rim, ornament, reflector and casing are all definitely located relative to each other.

The reflector flange 27 at suitable points about the periphery includes forwardly and inwardly directed tongues 60, see Fig. 2, that are adapted to receive and retain the closure adjacent the reflector with the sealing member 26 interposed therebetween. To maintain the reflector in association with the rim when the U-shaped clamp 15 is disassociated therefrom and spring 44 is not effective, there is provided a suitable number of spring wire clips 61. Each of said clips is interposed between the closure and the rim and normally projects the reflector forwardly so as to maintain the rim, closure, seal and reflector in unit formation. One portion of said clip engages the reflector flange 27 and the other portion bears upon the inturned rim flange 42 and seats in the groove included between the rim and flange 42.

The reflector flange 27, diametrically opposite the horn extensions, is provided with a notched lip 70 for closure engagement and support. Said lip seats in a notch formed in the lower peripheral edge of the reflector and definitely locates the same relative to the reflector and therefore relative to the rim and casing.

The invention claimed is:

1. In an ornamented lamp, a door rim, an ornament secured thereto including an inwardly extending anchorage, a reflector supported adjacent the rim, and a bifurcated reflector extension associated with said anchorage for locating the rim and reflector relative to each other.

2. In an ornamented lamp, a casing having a rim engageable flange at its forward periphery, a door rim having a complementary flange at its rearward periphery, a tongue and slot connection therebetween for definitely locating said casing and rim relative to each other, an ornament secured to said rim and including an inwardly extending anchorage, a reflector supported adjacent the rim, and a bifurcated reflector extension associated with said anchorage for locating the rim and reflector relative to each other, and the reflector relative to said casing.

3. In a lamp, a casing member having a rim engageable flange at its forward periphery, a door rim member having a complementary flange at its rearward periphery, a tongue integral with one member flange, said other member flange having a slot into which said tongue projects for definitely locating said rim and casing relative to each other, a reflector detachably supported adjacent the rim, a radial tongue and slot locating connection therebetween for definitely locating said reflector relative to said rim and said casing, a lens closure for said reflector, and a radial tongue and slot locating connection therebetween for securing predetermined positioning of said closure, reflector, rim and casing relative to each other.

4. A device as defined by claim 3 characterized by the lamp being ornamented and including an ornament secured to the rim by an inwardly extending anchorage, and the locating connection between said reflector and said rim comprising a bifurcated reflector extension associated with said anchorage.

5. In a lamp, a door rim having a forwardly and inwardly directed flange about its rear periphery and forming a groove with said rim, and a rearwardly directed inner extension of said flange concentric with the rim, and with a portion within the outlines of the same, a casing having a forwardly and inwardly directed rim engageable flange about its forward periphery for abutting the forwardly and inwardly directed rim flange and terminating just short thereof for telescopically receiving said inner extension for rim seating, and means carried by the casing and seated in said groove for securing the rim and casing together.

6. A device as defined by claim 3, characterized by the two of the locating connections being diametrically positioned opposite each other.

7. In a lamp, a door rim having an inwardly directed forwardly inclined flange upon its rear edge and with an inner rearward extension, a casing having on its forward edge a forwardly and inwardly directed flange for abutting the rim flange and telescopically receiving said extension, the outer surface of the rim and casing being uninterrupted continuations of the other at the junction, a closure for the rim, a reflector closed by the closure and mounted within the casing, means for simultaneously locking said rim and casing together by engaging the rim flange, means carried thereby for engaging the reflector, and a casing exposed and supported member for actuating both means for the purpose set forth.

8. In a lamp, a casing member having a rim engageable flange at its forward periphery, a door rim member therefor having a complementary flange at its rearward periphery, a tongue and slot locating connection therebetween, an ornament carried by one of said members, a reflection connection between said reflector and the member supporting said ornament and constituting the anchorage of the latter upon the former.

In witness whereof, I have hereunto affixed my signature.

FREDERICK W. C. NEUNER.